United States Patent
Hosoda

(10) Patent No.: US 11,258,329 B2
(45) Date of Patent: Feb. 22, 2022

(54) STATOR CORE AND ELECTRIC MOTOR WITH IMPROVED WATER RESISTANCE

(71) Applicant: Fanuc Corporation, Yamanashi (JP)

(72) Inventor: Akihiro Hosoda, Minamitsuru-gun (JP)

(73) Assignee: Fanuc Corporation, Yamanashi (JP)

( * ) Notice: Subject to any disclaimer, the term of this patent is extended or adjusted under 35 U.S.C. 154(b) by 23 days.

(21) Appl. No.: 16/780,160

(22) Filed: Feb. 3, 2020

(65) Prior Publication Data
US 2020/0251952 A1    Aug. 6, 2020

(30) Foreign Application Priority Data
Feb. 6, 2019    (JP) .............................. JP2019-019983

(51) Int. Cl.
*H02K 5/124* (2006.01)
*H02K 1/18* (2006.01)

(52) U.S. Cl.
CPC ............... *H02K 5/124* (2013.01); *H02K 1/18* (2013.01)

(58) Field of Classification Search
CPC ................................. H02K 5/124; H02K 1/18
USPC .... 310/216.003, 216.016, 216.018, 216.025, 310/216.031
See application file for complete search history.

(56) References Cited

U.S. PATENT DOCUMENTS

| | | | | |
|---|---|---|---|---|
| 3,293,469 A | * | 12/1966 | Crawford | H02K 19/20 310/168 |
| 4,659,953 A | * | 4/1987 | Luneau | G01P 3/465 310/111 |
| 5,477,096 A | * | 12/1995 | Sakashita | H02K 1/06 310/216.016 |
| 6,191,510 B1 | * | 2/2001 | Landin | H02K 1/04 310/216.016 |
| 7,994,680 B2 | * | 8/2011 | Sakuma | H02K 1/12 310/216.004 |
| 2015/0028717 A1 | | 1/2015 | Luo et al. | |

FOREIGN PATENT DOCUMENTS

| | | | |
|---|---|---|---|
| JP | 53089902 A | | 8/1978 |
| JP | 54129701 U | | 9/1979 |
| JP | 61104743 U | | 7/1986 |
| JP | 04244748 A | | 9/1992 |
| JP | 07163083 A | | 6/1995 |
| JP | 07163083 A | * | 6/1995 |
| JP | 53068002 U | | 6/1997 |
| JP | 2000341913 A | | 12/2000 |
| JP | 2002345182 A | * | 11/2002 |
| JP | 2004140966 A | | 5/2004 |
| JP | 2007060800 A | | 3/2007 |
| JP | 2009065831 A | | 3/2009 |
| JP | 2016032331 A | | 3/2016 |

(Continued)

*Primary Examiner* — Jose A Gonzalez Quinones

(74) *Attorney, Agent, or Firm* — RatnerPrestia

(57) ABSTRACT

A stator core of an electric motor is provided with a first core block and a second core block formed by laminating a plurality of large-diameter thin plates in a reversed arrangement with respect to each other causing outer circumferential edge burrs of the large-diameter thin plates to face each other, and with a small-diameter thin plate sandwiched between the first core block and the second core block, and having an outer diameter smaller than the cuter diameter of the large-diameter thin plate.

9 Claims, 6 Drawing Sheets

(56) References Cited

FOREIGN PATENT DOCUMENTS

| JP | 2016032331 | A | * | 3/2016 |
|----|------------|---|---|--------|
| JP | 5320875 | A | * | 10/2016 |
| JP | 2018067999 | A | | 4/2018 |
| JP | 2018078691 | A | * | 5/2018 |

* cited by examiner

STATOR CORE AND ELECTRIC MOTOR WITH IMPROVED WATER RESISTANCE

CROSS-REFERENCE TO RELATED APPLICATIONS

This application is a new U.S. Patent Application that claims benefit of Japanese Patent Application No. 2019-019983 dated Feb. 6, 2019, the disclosure of this application is being incorporated herein by reference in its entirety for all purposes.

BACKGROUND OF THE INVENTION

1. Field of the Invention

The present invention relates to an electric motor, and particularly relates to a stator core and an electric motor with improved water resistance.

2. Description of the Related Art

When a stator core is manufactured by laminating a plurality or thin plates formed by punching an electromagnetic steel sheet, punching burrs are formed on circumferential edge portions of the thin plates. Documents below are each known as related art relating to such burrs as described above.

In JP 2016-32331 A, it is disclosed that in a stator core formed by laminating a plurality of core plates, which are formed by punching an electromagnetic steel sheet from a first plate surface side using a movable die, the core plate whose first plate surface faces one side in the axial direction and the core plate whose first plate surface faces the other side in the axial direction are alternately laminated in the axial direction, and an adhesive material is filled through a gap between the laminated core plates.

In JP 2009-65831 A, it is disclosed that errors in the axial direction or errors in the width of a thin strip laminate are suppressed by dividing the thin strip laminate into two partial thin strip laminates, forming the single thin strip laminate by combining the two partial thin strip laminates, and facing the punching burrs away from each other at a joined part of the adjacent thin strip laminates.

In JP 2004-140966 A, it is disclosed that insulation defects between electromagnetic steel sheets due to burrs are prevented by causing the sheet thickness of a circumferential edge portion of the punched-out electromagnetic steel sheet to be smaller than a difference between the sheet thickness of the electromagnetic steel sheet and the height of the burrs generated at the time of punching.

In JP H7-163083 A, with respect to an electric motor in which a housing covering an outer circumferential surface of a stator core is omitted, a waterproof electric motor is disclosed that is provided with a front support member and a rear support member that sandwich the stator core, and each of the support members includes an annular protrusion, which protrudes radially outward from the outer circumferential surface thereof, in the vicinity of an end face, of each of the support members, adjacent to the stator core. Further, a sealing agent is coated and solidified covering the outer circumferential surface of each of the support members and the outer circumferential surface of the stator core located between the annular protrusions.

In JP H4-244748 A, a stator yoke is disclosed in which a plurality of thin plates are laminated and burrs derived from sheared surfaces of the adjacent thin plates cover fractured surfaces of the thin plates that are recessed from the circumferential edges of the thin plates.

In JP S53-89902 A, it is disclosed that a pair of steel plates having different protruding directions of "burrs" generated by press processing are alternately stacked, and by causing only the pair of steel plates in which the "burrs" are abutted against each other to be short-circuited, edge portions of the steel plates stacked in multiple layers are prevented from being completely short-circuited.

In JP 2000-341913 A, a stator core is disclosed in which two types of stator materials having different cuter diameters are alternately laminated and punched-out end faces of the stator materials are not aligned, and which prevents an eddy current from being caused by the punched-out end faces.

SUMMARY OF THE INVENTION

FIG. 9A is a partial cross-sectional view of a stator core, and FIG. 9B is a partial side view of the stator core. When laminating a plurality of thin plates 90 to manufacture the stator core, the thin plates 90 may be laminated being reversed with respect to each other to improve motor characteristics, and the like (in particular, reduction of cogging by a step skew). At this time, as indicated by dashed lines 91, a relatively large gap is created between burrs 92 at a part at which tips of the burrs 92 formed on the thin plates 90 face each other. Such a gap is 10 μm or more, and may reach 70 to 80 μm due to changes with time. Therefore, there is an impact on water resistance of the stator core. In particular, when an electric motor, in which a housing covering an outer circumferential surface of the stator core is omitted, is applied to a machine tool or the like, cutting fluid or the like may enter the electric motor from a direction indicated by an arrow 93.

Thus, there is a demand for a technology that improves the water resistance of the stator core while enhancing the motor characteristics.

One aspect of the present disclosure provides a stator core that includes a first core block and a second core block formed by laminating a plurality of large-diameter thin plates in a reversed arrangement with respect to each other causing outer circumferential edge burrs of the large-diameter thin plates to face each other, and a small-diameter thin plate, sandwiched between the first core block and the second core block, and having an outer diameter smaller than an outer diameter of the large-diameter thin plate.

Another aspect of the present disclosure provides an electric motor including the stator core of the present disclosure, in which a housing covering an outer circumferential surface of the stator core is omitted.

DETAILED DESCRIPTION

Figure 1:
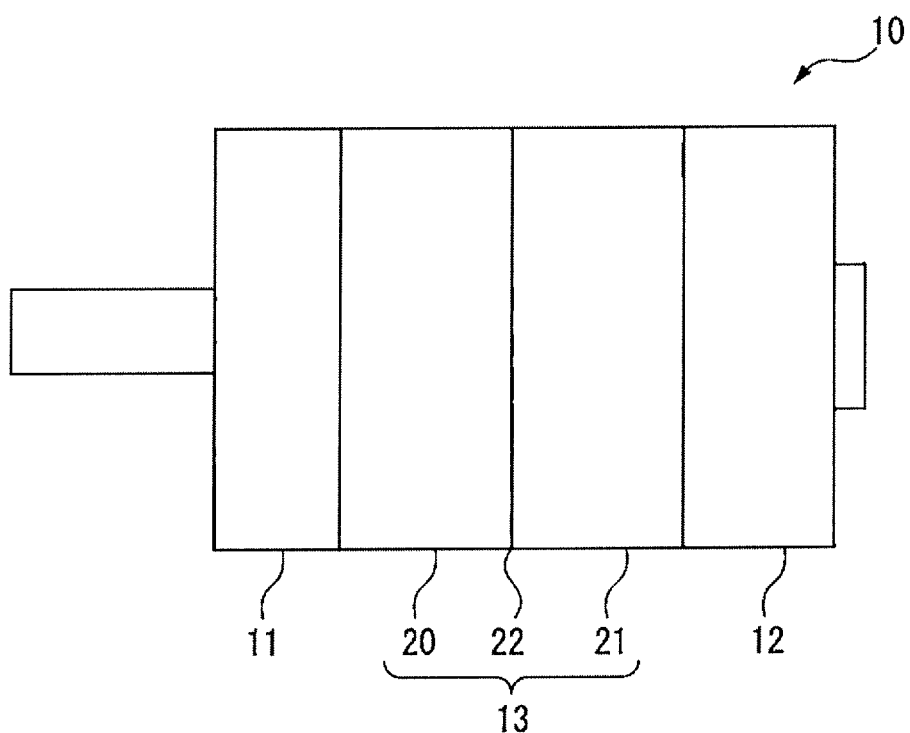
FIG. 1 is a side view of an electric motor according to an embodiment.

Embodiments of the present disclosure will be described in detail below with reference to the accompanying drawings. In the drawings, identical or similar constituent elements are given identical or similar reference signs. Additionally, the embodiments described below are not intended to limit the technical scope of the invention or the meaning of terms set forth in the claims. Note that in this specification, the term "front" means a load side and an output side of an electric motor, and the term "rear" means a side opposite to the load side and opposite to the output side of the electric motor.

FIG. 1 is a side view of an electric motor 10 according to a present embodiment. Note that the electric motor 10 of the present example is a servomotor used in a machine tool, an industrial robot, or the like, but is not limited thereto, and can also be applied to other electric motors as long as it is an electric motor in which a housing covering an outer circumferential surface of a stator core is omitted. The electric motor 10 includes a stator core 13 sandwiched between a front housing 11 and a rear housing 12. The stator core 13 includes a first core block 20, a second core block 21, and a small-diameter thin plate 22 sandwiched between the first core block 20 and the second core block 21. The first core block 20 and the second core block 21 are formed by laminating a plurality of large-diameter thin plates (see FIG. 2) formed by punching an electromagnetic steel sheet. The cuter diameter of the small-diameter thin plate 22 is smaller than the outer diameter of the large-diameter thin plate over the entire outer circumference of the large-diameter thin plate.

Figure 2A:
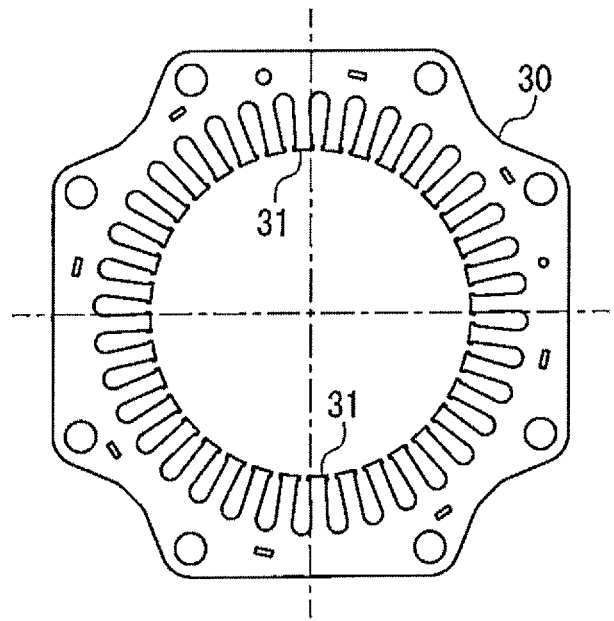
FIG. 2A is a plan view illustrating a front side of a large-diameter thin plate according to the embodiment.
Figure 2B:
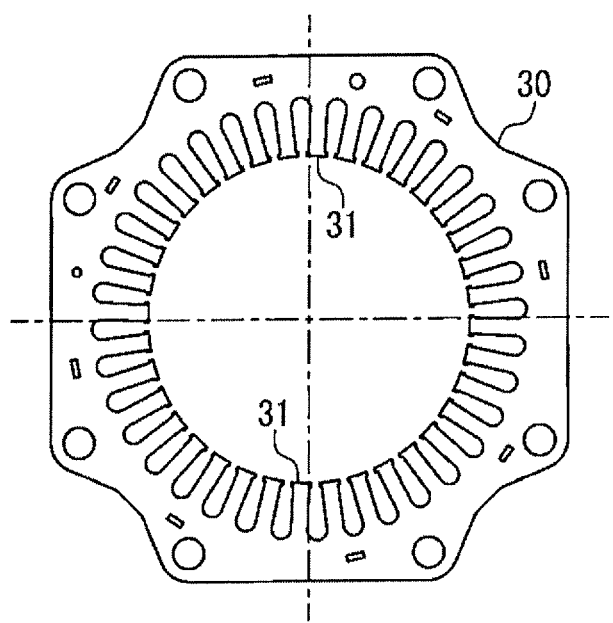
FIG. 2B is a plan view illustrating a back side of the large-diameter thin plate according to the embodiment.

FIG. 2A is a plan view illustrating a front side of a large-diameter thin plate 30, and FIG. 2B is a plan view illustrating a back side of the large-diameter thin plate 30. The large-diameter thin plate 30 is generally formed through three punching steps. In a first step, a rotor portion (not illustrated) of the electric motor 10 is punched out, in a second step, an inner shape portion and a slot portion of the large-diameter thin plate 30 are punched out, and in a third step, an outer shape portion of the large-diameter thin plate 30 is punched out. In the present example, since the inner shape portion and the slot portion of the large-diameter thin plate 30 are punched out from the front side to the back side of the electromagnetic steel sheet, inner circumferential edge burrs of the large-diameter thin plate 30 (see FIG. 3) are formed on the back side of the large-diameter thin plate 30. Further, since the outer shape portion of the large-diameter thin plate 30 is punched out from the back side to the front side of the electromagnetic steel sheet, outer circumferential burrs of the large-diameter thin plate 30 (see FIG. 3) are formed on the front side of the large-diameter thin plate 30.

Further, the large-diameter thin plate 30 is preferably provided with a plurality of pole teeth 31 at positions asymmetrical to each other in vertical and horizontal directions. In this way, when, for example, two of the large-diameter thin plates 30 are arranged being reversed with respect to each other, the plurality of pole teeth 31 are displaced in the circumferential direction between the thin plates, thereby allowing a step skew to be formed.

Figure 3:
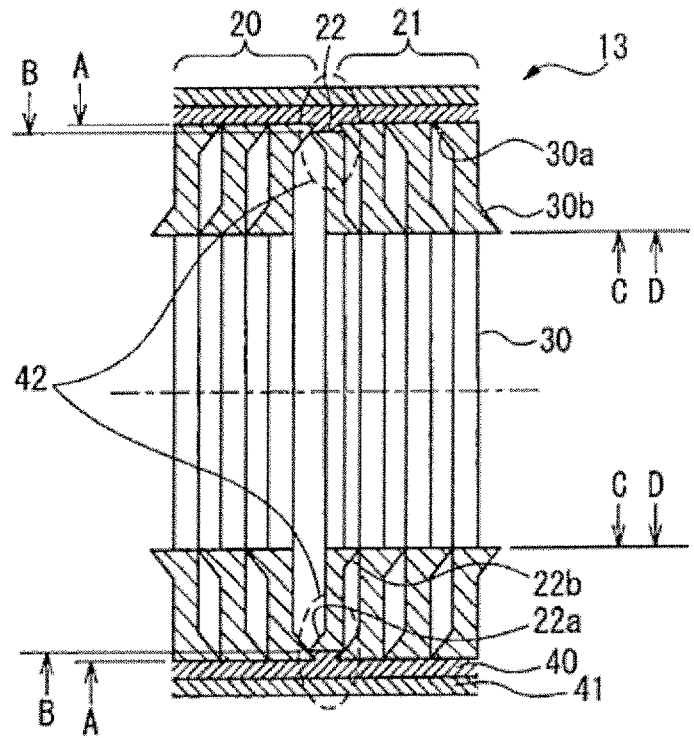
FIG. 3 is a partial cross-sectional view of a stator core according to the embodiment.

FIG. 3 is a partial cross-sectional view of the stator core 13 according to the present embodiment. For ease of understanding, only six of the large-diameter thin plates 30 are illustrated in FIG. 3, but it should be noted that approximately 140 to 150 plates are laminated together to form the entire stator core. It should also be noted that the burrs are depicted as relatively large in the present disclosure for ease of understanding. The first core block 20 is formed by laminating the plurality of large-diameter thin plates 30 causing outer circumferential edge burrs 30a of the large-diameter thin plates 30 to face the same direction. The second core block 21 has the same configuration as the first core block 20, but the first core block 20 and the second core block 21 are arranged being reversed with respect to each other causing the outer circumferential edge burrs 30a of the large-diameter thin plates 30 to face each other. As described above, since the plurality of polar teeth 31 (see FIG. 2) are positionally displaced at inter-core block section due to the reversed arrangement, the step skew is formed between the first core block 20 and the second core block 21. As a result, cogging of the electric motor 10 is reduced.

A sealing agent 40 is applied onto an outer circumferential surface of the stator core 13, and a coating agent 41 is coated on an outer circumferential surface of the sealing agent 40. Since the tips of the burrs do not collide with each other on the outer circumferential surface of the first core block 20 or the second core block 21, gaps are not easily formed. Therefore, in the electric motor in which the housing covering the outer circumferential surface of the stator core 13 is omitted, water resistance is maintained by the sealing agent 40, the coating agent 42, and the like. However, since the tips of the burrs collide with each ether on the outer circumferential surface of an inter-core block section 42 indicated by dashed lines, the small-diameter thin plate 22 having an outer diameter B that is smaller than an cuter diameter A of the large-diameter thin plate 30 is inserted into the inter-core block section 42, thereby eliminating a relatively large gap and improving the water resistance.

Further, the small-diameter thin plate 22 includes an outer circumferential edge burr 22a, and an inner circumferential edge burr 22b protruding in a direction opposite from the outer circumferential burr 22a. Since an inner diameter C of the small-diameter thin plate 22 of the present example is the same as an inner diameter D of the large-diameter thin plate 30, and the gap between the thin plates on the protruding side of the inner circumferential edge burr 22b of the small-diameter thin plate 22 is narrower than the gap between the other thin plates, there is a possibility that the tip of the inner circumferential burr 22b of the email-diameter thin plate 22 may push the adjacent large-diameter thin plate 30 outward, thereby causing a secondary gap to be created on the outer circumferential surface of the inter-core block section 42 indicated by the dashed lines. Therefore, the inner circumferential edge burr 22b of the small-diameter thin plate 22 is preferably smaller than the outer circumferential edge burr 30a of the large-diameter thin plate 30 and preferably fits within the gap between the thin plates. The height of the burrs can be controlled by clearance adjustment between punches and dies, plate thickness adjustment between the small-diameter thin plate 22 and the large-diameter thin plate 30, or the like (the plate thickness of the small-diameter thin plate 22 is made thinner than the plate thickness of the large-diameter thin plate 30, for example).

Figure 4:
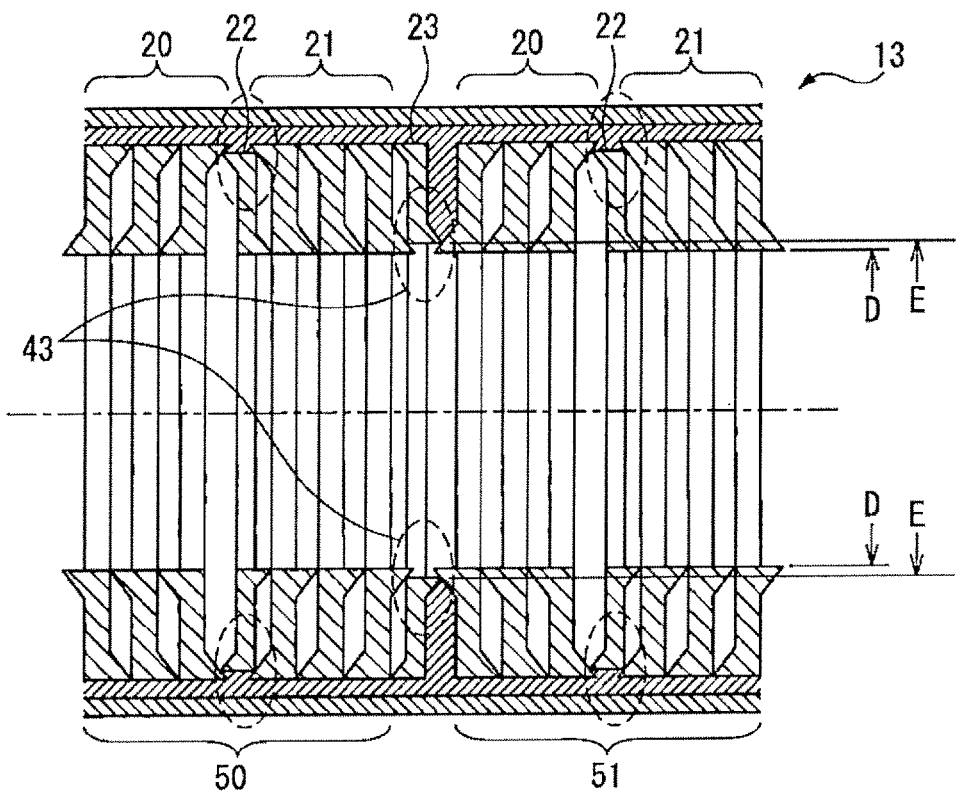
FIG. 4 is a cross-sectional view illustrating a modified example of the stator core.

FIG. 4 is a cross-sectional view illustrating a modified example of the stator core 13. The stator core 13 of the present example includes a first core set 50 including the first core block 20, the second core block 21, and the small-diameter thin plate 22, and includes a second core set 51 having the same configuration as the first core set 50 and forming a step skew between the first core set 50 and the second core set 51. Since the tips of the burrs also collide with each other in an inter-core set section 43 indicated by dashed lines, an inter-set thin plate 23, having an inner diameter E larger than the inner diameter D of the large-diameter thin plate 30, is inserted into the inter-core set section 43, thereby eliminating a relatively large gap and improving the water resistance.

Figure 5:
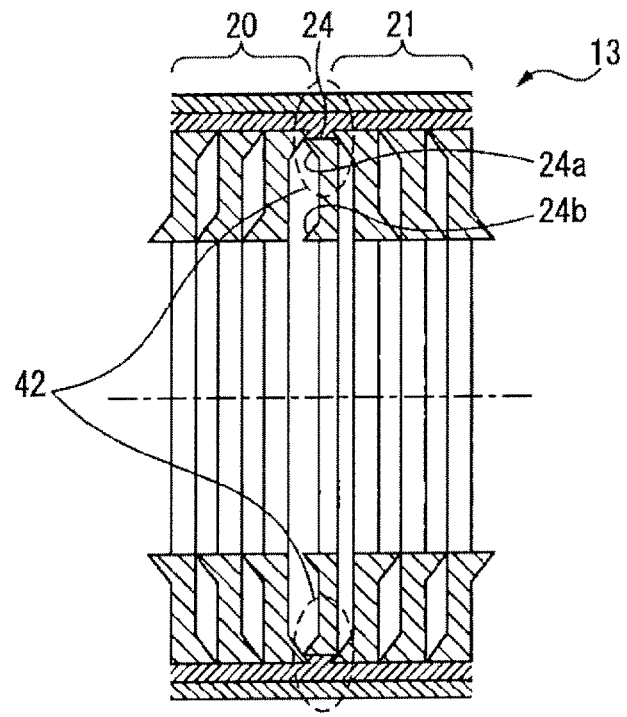
FIG. 5 is a cross-sectional view illustrating a modified example of a small-diameter thin plate.

FIG. 5 is a cross-sectional view illustrating a modified example of the small-diameter thin plate. An inner circumferential edge burr 24b of a small-diameter thin plate 24 of the present example is different from the above-described inner circumferential edge burr in that it protrudes in the same direction as an outer circumferential edge burr 24a of the small-diameter thin plate 24. Since the gap between the thin plates on the protruding side of the inner circumferential edge burr 24b of the small-diameter thin plate 24 is wider than the gap between the other thin plates, the tip of the inner circumferential edge burr 24b of the small-diameter thin plate 24 does not push the adjacent large-diameter thin plate 30 outward. As a result, the secondary gap is not easily created on the outer circumferential surface of the inter-core block section 42 indicated by the dashed lines. Further, there is no need to control the height of the burrs of the small-diameter thin plate 24 of the present example.

Figure 6:
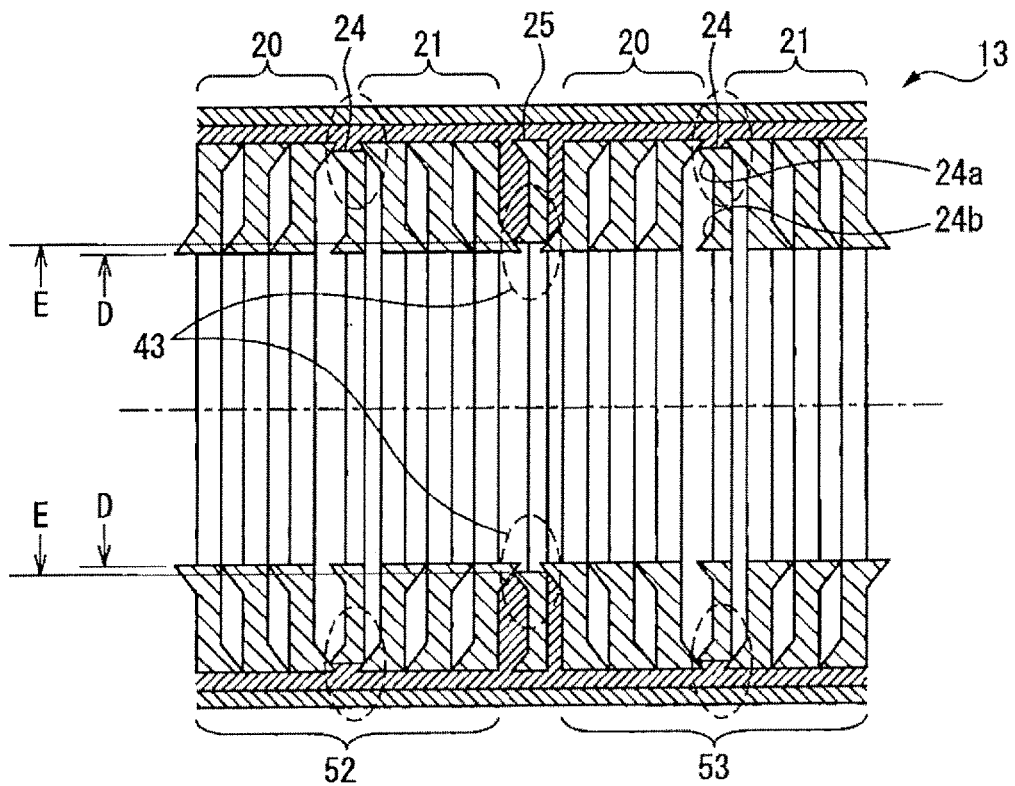
FIG. 6 is a cross-sectional view illustrating another modified example of the stator core.

FIG. 6 is a cross-sectional view of another modified example of the stator core 13. The stator core 13 of the present example includes a first core set 52 including the first core block 20, the second core block 21, and the small-diameter thin plate 24, and includes a second core set 53 having the same configuration as the first core set 52 and forming a step skew between the first core set 52 and the second core set 53. Since the tips of the burrs also collide with each other in the inter-core set section 43 indicated by the dashed lines, an inter-set thin plate 25, having the inner diameter E larger than the inner diameter D of the large-diameter thin plate 30, is inserted into the inter-core set section 43, thereby eliminating a relatively large gap and improving the water resistance.

Figure 7:
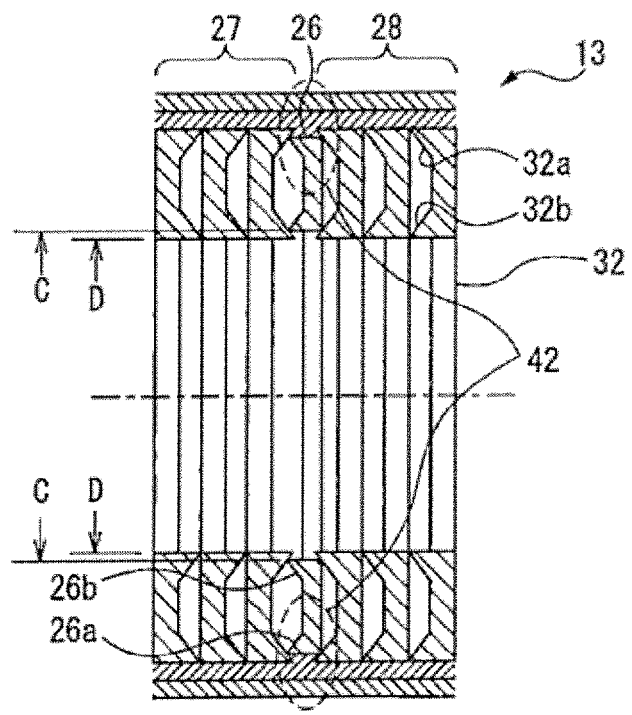
FIG. 7 is a cross-sectional view illustrating a modified example of the large-diameter thin plate.

FIG. 7 is a cross-sectional view illustrating a modified example of the large-diameter thin plate. The present example is different from the above-described examples in that an inner circumferential edge burr 32b of a large-diameter thin plate 32 protrudes in the same direction as an outer circumferential edge burr 32a of the large-diameter thin plate 32, and that the inner diameter C of a small-diameter thin plate 26 is larger than the inner diameter D of the large-diameter thin plate 32. As a result, the tip of the inner circumferential edge burr 32b of the large-diameter thin plate 32 does not collide with the tip of an inner circumferential edge burr 26b of the small-diameter thin plate 26, and thus, the secondary gap is not easily created in the outer circumferential surface of the inter-core block section 42 indicated by the dashed lines. Further, there is also no need to control the height of the burrs of the small-diameter thin plate 26 of the present example.

Figure 8:
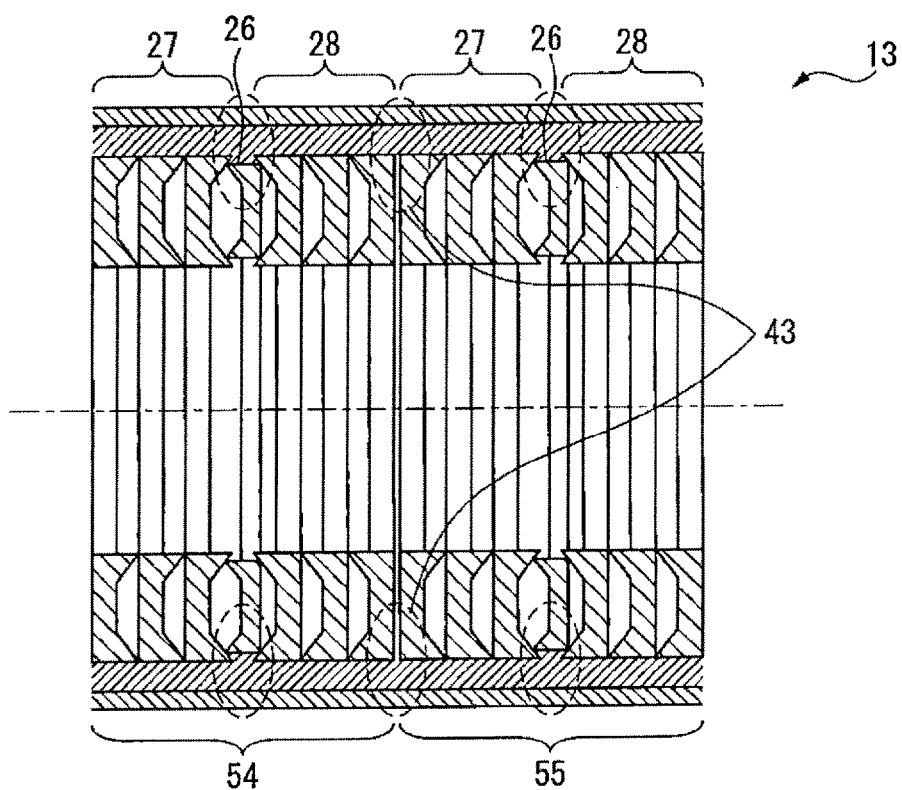
FIG. 8 is a cross-sectional view illustrating yet another modified example of the stator core.
Figure 9A:
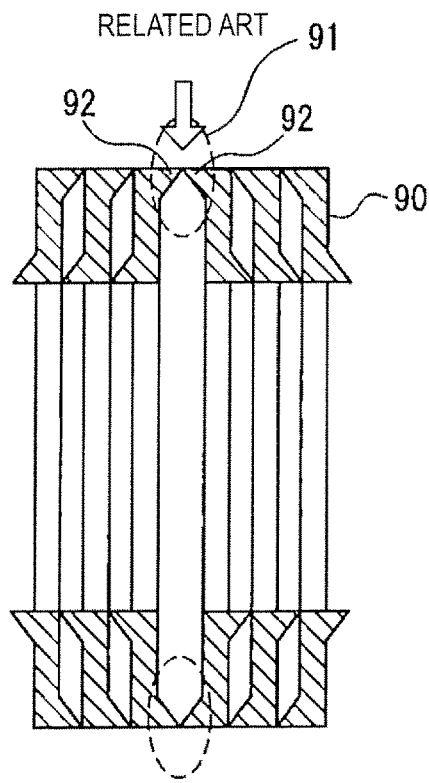
FIG. 9A is a partial cross-sectional view of the stator core.
Figure 9B:
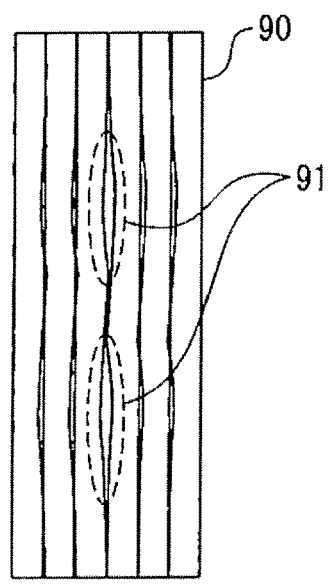
FIG. 9B is a partial side view of the stator core.

FIG. 8 is a cross-sectional view of yet another modified example of the stator core 13. The stator core 13 of the present example includes a first core set 54 including a first core block 27, a second core block 28, and the small-diameter thin plate 26, and includes a second core set 55 having the same configuration as the first core set 54. In the present example, since the tips of the burrs do not collide with each other in the inter-core set section 43 indicated by the dashed lines, it is not necessary to insert the inter-set thin plate between the core sets.

According to the above-described embodiment, the stator core 13 with the improved water resistance at inter-core block section can be provided using the small-diameter thin plates 22, 24, and 26. In addition, the water resistance between the core sets can also be improved by the inter-set thin plates 23 and 25. In particular, the stator core 13 of the present disclosure is useful for the electric motor in which the housing covering the outer circumferential surface of the stator core is omitted.

Although some embodiments have been described in this specification, the present invention is not limited to the above-described embodiments, and it is to be understood that various changes can be made without departing from the scope of the appended claims.

The invention claimed is:

1. A stator core of an electric motor, the stator core comprising:
   a first core block and a second core block formed by laminating a plurality of large-diameter thin plates in a reversed arrangement with respect to each other causing burrs of the large-diameter thin plates to face each other; and
   a small-diameter thin plate having an outer diameter smaller than an outer diameter of the large-diameter thin plate,
   wherein only one sheet of the small-diameter thin plate is arranged in an internal space between the first core block and the second core block at which the burrs face each other.

2. The stator core of the electric motor of claim 1, the stator core further comprising:
   a sealing agent on an outer circumferential surface of the stator core.

3. The stator core of the electric motor of claim 1, wherein
   the small-diameter thin plate includes an outer circumferential edge burr, and an inner circumferential edge burr protruding in a direction opposite from the outer circumferential edge burr, and
   the inner circumferential edge burr of the small-diameter thin is smaller than the burr of the large-diameter thin plate.

4. The stator core of the electric motor of claim 1, wherein
   the small-diameter thin plate includes an outer circumferential edge burr, and an inner circumferential edge burr protruding in the same direction as the outer circumferential edge burr.

5. The stator core of the electric motor of claim 1, wherein
   an inner circumferential edge burr of the large-diameter thin plate protrudes in the same direction as an outer circumferential burr of the large-diameter thin plate, and
   an inner diameter of the small-diameter thin plate is larger than an inner diameter of the large-diameter thin plate.

6. The stator core of the electric motor of claim 1, wherein
   a step skew is formed between the first core block and the second core block by the reversed arrangement.

7. The stator core of the electric motor of claim 1, the stator core further comprising:
   a first core set including the first core block, the second core block, and the small-diameter thin plate; and a second core set having the same configuration as the first core set and forming a step skew between the first core set and the second core set.

8. The stator core of the electric motor of claim 7, the stator core further comprising:
an inter-set thin plate between the first core set and the second core set, wherein
an inner diameter of the inter-set thin plate is larger than the inner diameter of the large-diameter thin plate.

9. An electric motor comprising:
the stator core of claim 1, wherein
a housing covering an outer circumferential surface of the stator core is omitted.

* * * * *